United States Patent [19]

Hidden et al.

[11] 4,259,043

[45] * Mar. 31, 1981

[54] THRUST BEARING/COUPLING COMPONENT FOR ORBITING SCROLL-TYPE MACHINERY AND SCROLL-TYPE MACHINERY INCORPORATING THE SAME

[75] Inventors: William P. Hidden, Wenham; John E. McCullough, Carlisle, both of Mass.

[73] Assignee: Arthur D. Little, Inc., Cambridge, Mass.

[*] Notice: The portion of the term of this patent subsequent to Jul. 10, 1996, has been disclaimed.

[21] Appl. No.: 32,178

[22] Filed: Apr. 23, 1979

Related U.S. Application Data

[63] Continuation-in-part of Ser. No. 807,414, Jun. 16, 1977, Pat. No. 4,160,629.

[51] Int. Cl.³ .............................................. F01C 21/02
[52] U.S. Cl. ............................................ 418/55; 74/86; 308/231
[58] Field of Search .................... 418/54, 55, 59; 308/231, 229, 227; 74/86

[56] References Cited

U.S. PATENT DOCUMENTS

| | | | |
|---|---|---|---|
| 434,476 | 8/1890 | Simonds | 308/229 |
| 525,409 | 9/1894 | Gates | 74/86 |
| 2,829,528 | 4/1958 | Hulick, Jr. | 74/86 |
| 3,924,977 | 12/1975 | McCullough | 418/55 |
| 4,156,585 | 5/1979 | Ross | 418/61 B |
| 4,160,629 | 7/1979 | Hidden et al. | 418/55 |
| 4,181,479 | 1/1980 | Ross | 418/61 B |

FOREIGN PATENT DOCUMENTS 977251  3/1951  France .............................. 74/86

*Primary Examiner*—Leonard E. Smith
*Attorney, Agent, or Firm*—Bessie A. Lepper

[57] ABSTRACT

A thrust bearing/coupling component for use in scroll-type apparatus which may be a compressor, expander, fluid pump or vacuum pump. The resulting apparatus is particularly suited for use as auxiliary equipment in automotive power systems. The component of this invention comprises rotating or oscillating load carrying members, preferably ball bearings, confined within facing indentations cut in the orbiting scroll member end plate surface and an associated surface in a member stationary with respect to the orbiting scroll member. The thrust bearing/coupling component couples the stationary and orbiting scroll members in a predetermined angular relationship and it may be used to carry either expansive or compressive axial loads on the scroll members to achieve efficient radial sealing of the moving scroll fluid pockets while controlling surface wearing so that the scroll apparatus may be operated for an extended period of time without servicing.

45 Claims, 23 Drawing Figures

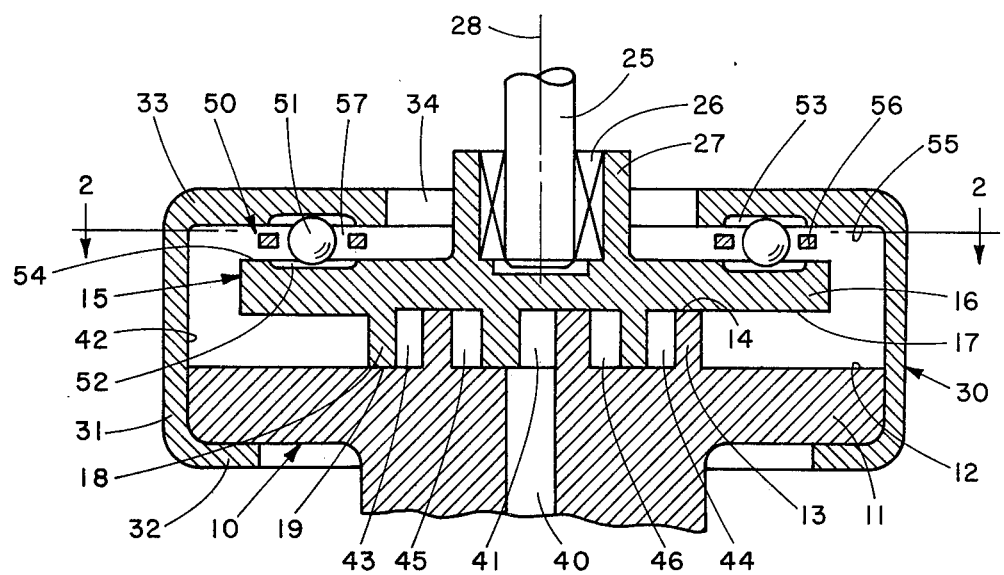
Fig. 1
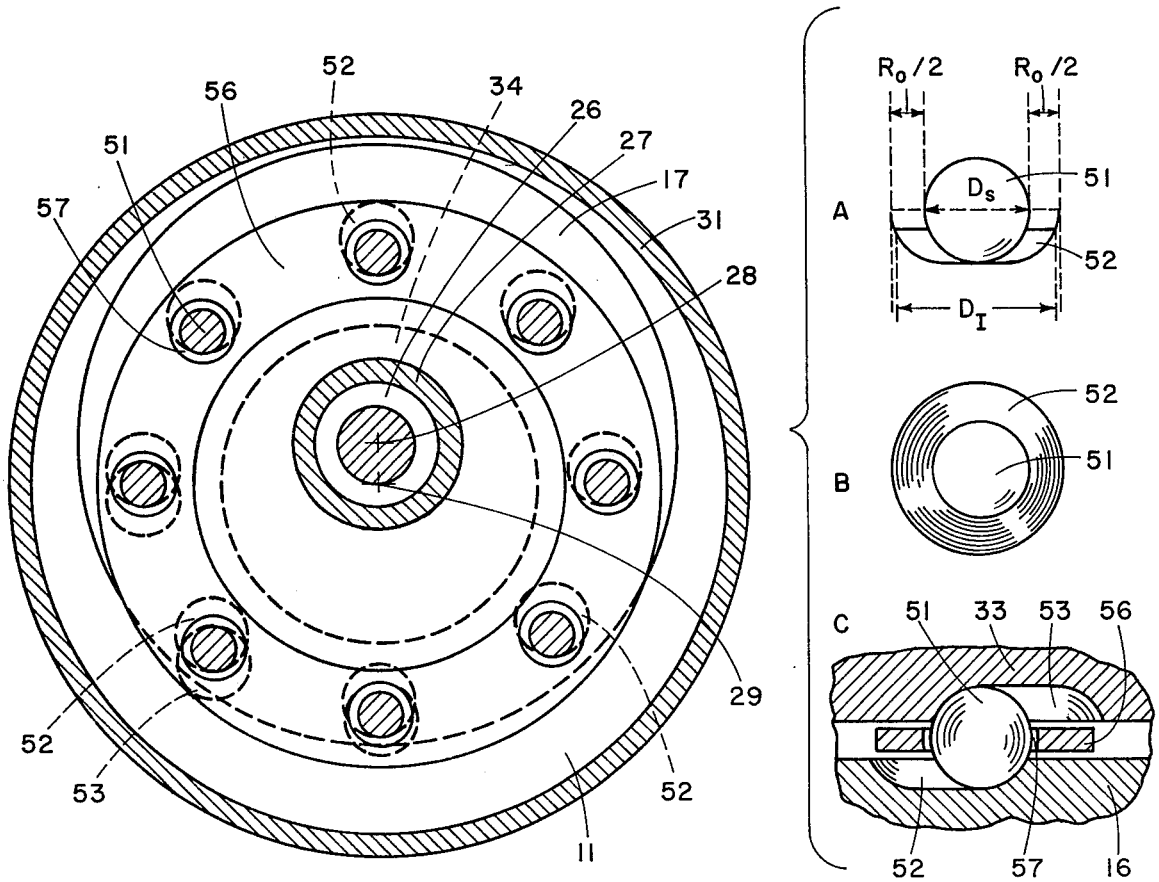
Fig. 2
Fig. 3

THRUST BEARING/COUPLING COMPONENT FOR ORBITING SCROLL-TYPE MACHINERY AND SCROLL-TYPE MACHINERY INCORPORATING THE SAME

This application is a continuation-in-part of our application Ser. No. 807,414, filed June 16, 1977, now U.S. Pat. No. 4,160,629.

This invention relates to scroll-type apparatus and more particularly to scroll-type apparatus having a combined thrust bearing/coupled component which makes the apparatus particularly suitable for relatively small, highly efficient compressors, vacuum pumps and liquid fuel pumps for incorporation, for example, in automobiles. The ongoing quest for lighter, more efficient automotive power systems has recently led to the consideration of the use of scroll-type apparatus for such auxiliary equipment as air conditioning refrigerant compressors, vacuum pumps and immersible fuel pumps in automobiles.

Scroll apparatus in general offers certain inherent basic advantages over presently used equipment designed for comparable roles. Among these advantages are efficient operation, the development of little or essentially no vibratory motion, a substantially uniform torque requirement on the means used to drive the orbiting scroll member and flexibility in design and configuration as well as in the choice of materials used in the construction of the scroll apparatus. To make full use of these advantages in constructing auxiliary equipment for automotive uses, it would also be desirable to be able to increase the efficiency, decrease the size and weight, simplify the assembly and lower the cost of such auxiliary equipment. By means of the thrust bearing/coupling component of this invention, the attainment of these added advantages is made possible.

There is known in the art a class of devices generally referred to as "scroll" pumps, compressors and expanders wherein two interfitting spiroidal or involute spiral elements of like pitch are mounted on separate end plates to form stationary and orbiting scroll members. These sprial elements are angularly and radially offset to contact one another along at least one pair of line contacts such as between sprial curved surfaces. A pair of line contacts will lie approximately upon one radius drawn outwardly from the central region of the scrolls to form one or more fluid volumes or pockets. The angular position of these pockets varies with relative orbiting of the spiral centers; and all pockets maintain the same relative angular position. As the contact lines shift along the scroll surfaces, the pockets thus formed experience a change in volume. In compressors and expansion engines there are thus created zones of lowest and highest pressures which are connected to fluid ports. In vacuum pumps and in liquid pumps the volume ratio remains unity throughout. The outermost and innermost pockets are connected to liquid ports, and the flow of liquid may be either outwardly from the innermost pocket or inwardly from the outermost pocket. For convenience the flow in either case may be generally referred to as radial, although it takes on a spiral-like pattern.

An early patent to Creux (U.S. Pat. No. 801,182) describes scroll-type apparatus in general. Among the prior art patents disclosing scroll apparatus, a number of them have mentioned the interchangeable use of such devices as compressors, expanders and pumps. Common to all of these scroll-type devices is the need to provide means for adequate radial sealing of the moving fluid pockets and for coupling the scroll members in a fixed angular relationship. Since the problem of radial sealing arises from the need to prevent any appreciable fluid leakage from the pockets of higher pressure to adjacent pockets of lower pressure, it is necessary to provide an effective fluid seal between the contacting ends of the involute spiral elements and the complementary or contacting facing surfaces of the end plates. One of the simplest and most direct solution to this problem is through the use of thrust bearings as axial load carrying means designed and positioned to achieve effective sealing without causing undue wear of the contacting surfaces. These thrust bearings may be used to carry a predetermined expansive load and to urge the contacting surfaces together in the case of compressors and expanders wherein at least the inner fluid pockets are maintained at pressures greater than the pressure maintained within the scroll housing and they may be used to carry a predetermined compressive load to prevent undue contacting surface wear in the case of vacuum pumps and liquid pumps operating against a back pressure wherein the fluid pockets are at pressures less than the pressure maintained within the scroll housing.

In copending application Ser. No. 807,414, of which this application is a continuation-in-part, we have disclosed an immersible scroll-type liquid pump particularly suited as a fuel pump for automobiles. The liquid pump described in this copending application comprises a scroll pump within a housing which defines a chamber therein and which has liquid inlet means on one end and liquid discharge means on the other end. The scroll apparatus within the housing comprises stationary and orbiting scroll members having, respectively, stationary and orbiting end plates presenting facing surfaces, each of the scroll members having porting means arranged to prevent the development of any appreciable pressure pulsations during pumping and being located within the housing chamber in liquid receiving relationship to the liquid inlet means. Also provided are coupling means to maintain the stationary and orbiting scroll members in a predetermined angular relationship; and driving means, including motor means for driving the orbiting scroll member, located within the chamber between the scroll members and the other end of thehousing. In operation, liquid is pumped radially outward by the scroll members and through the pump and it flows around the driving means and maintains a predetermined hydraulic pressure within the chamber to provide axial loading on the scroll members. In those embodiments of the pump which are requred to deliver liquid under moderate to high pressures, axial compresive load carrying means are also incorporated. In some embodiments, the functions of the coupling means and the load carrying means may be incorporated in a single component.

We have now discovered that it is possible to combine the coupling means and the load carrying means in compresors, expanders and vacuum pumps as well as in liquid pumps of various designs. Through such a combination of two distinct functions into a single apparatus component it is possible to attain the aforementioned additional advantages sought in scroll apparatus which is particularly, but not solely, suitable for automotive auxiliary equipment—namely, increased efficiency, decreased size and weight, simplified assembly and lower cost.

It is therefore a primary object of this invention to provide scroll-type apparatus which, in addition to the advantages inherent in such machinery, also possesses advantages making the apparatus particularly suitable as auxiliary equipment for automotive power plants. It is another object to provide apparatus of the character described which, for any given application, is relatively smaller, lighter in weight and more efficient than apparatus presently used for the same purpose. Yet another object of this invention is the providing of auxiliary automotive equipment for air-conditioning compressors, vacuum pumps and the like which operates with minimum vibration and uniform torque requirements thus minimizing any detrimental effects on the prime mover with which the equipment is associated. It is an additional object of this invention to provide scroll-type apparatus for which assembling and aligning of components are simplified and which are lower in cost than heretofore realizable. Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a longitudinal cross section through a scroll-type apparatus constructed in accordance with this invention having spheres which undergo continuous rotary motion as the axial load carrying means;

FIG. 2 is a cross section of the apparatus of FIG. 1, taken through plane 2—2 of FIG. 1, illustrating the respective positioning of the thrust bearing/coupling component used;

FIG. 3 presents details in diagrammatic plan and cross sectional views of the factors involved in the use of the thrust bearing/coupling component of FIGS. 1 and 2;

Figure 4:
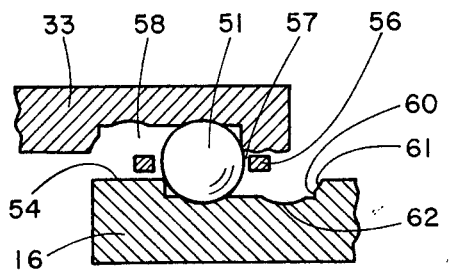
FIG. 4 illustrates in partial cross section a modified configuration of the circular indentations in the two apparatus elements between which the thrust bearing-/coupling component is located.

According to one aspect of this invention there is provided a thrust bearing/coupling component capable of simultaneously coupling an orbiting scroll member having a predetermined orbit radius and a stationary scroll member in predetermined angular relationship as the orbiting scroll member is orbited with respect to the stationary scroll member and carrying axial loads imposed on the scroll members, comprising in combination a plurality of first circular space indentations cut in one surface of the orbiting scroll member; a plurality of second circular spaced indentations of the same cross sectional configuration as the first indentations cut in a surface maintained statonary with respect to the orbiting scroll member and facing the first indentations, the centers of all of the indentations being located on circles having the same radius; and an axial load carrying rolling sphere movable within each facing pair of indentations, the relative diameters of the spheres and of the indentations being such as to accommodate the orbit radius while maintaining the predetermined angular relationship desired between the scroll members.

According to another aspect of this invention there is provided a thrust bearing/coupling component capable of simultaneously coupling an orbiting scroll member and a stationary scroll member in predetermined angular relationship as the orbiting scroll member is orbited with respect to the stationary scroll member and carrying axial loads imposed on the scroll members, comprising in combination load carrying rolling members; a ring member having a plurality of uniformly spaced bearing pads having first and second oppositely disposed surfaces in each of which is cut an indentation to provide a plurality of first and second oppositely disposed indentations; a plurality of third indentations cut in one surface of the orbiting scroll member corresponding in location to the first indentations and defining therewith a first plurality of tracks for the load carrying rolling memmbers retained therein; a plurality of fourth indentations cut in a surface maintained stationary with respect to the orbiting scroll member corresponding in location to the second indentations and defining therewith a second plurality of tracks for the load carrying rolling members retained therein; the first and second tracks being of a size and configuration which permit the load carrying rolling members to undergo oscillatory motion over a distance equal to the orbit radius associated with the orbiting scroll member and the longer axes of said first tracks being perpendicular to those of the second tracks.

According to a further object of this invention there is provided a positive fluid displacement apparatus suitable as a fluid compressor, expander or pump, comprising in combination a staionary scroll member comprising a stationary end plate and a stationary involute wrap; an orbiting scroll member, comprising an orbiting end plate and an orbiting involute wrap; means to orbit the orbiting scroll member with a predetermined radius with respect to the stationary scroll member whereby the involute wraps make moving line contacts to seal off and define moving pockets of variable volume including a central pocket; housing means enclosing the stationary and orbiting scroll members and defining a peripheral fluid zone therearound; and a thrust bearing-/coupling component capable of simultaneously coupling the orbiting and stationary scroll members in predetermined angular relationship and carrying axial loads imposed on the scroll members and comprising a plurality of first circular spaced indentations cut in one surface of the orbiting scroll member; a plurality of second circular spaced indentations of the same cross sectional configuration as the first indentations of the same cross sectional configuration as the first indentations cut in a surface maintained stationary with respect to the orbiting scroll member and facing the first indentations, the centers of all of the indentations being located on circles having the same radius, and an axial load carrying rolling sphere movable within each facing pairs of indentations, the relative diameter of the spheres and of the indentations being such as to accommodate the orbit radius while maintaining the predetermined angular relationship between the scroll members.

According to still a further aspect of this invention there is provided a positive fluid displacement apparatus suitable as a fluid compressor, expander or pump, comprising in combination a stationary scroll member comprising a stationary end plate and a stationary involute wrap; an orbiting scroll member, comprising an orbiting end plate and an orbiting involute wrap; means to orbit the orbiting scroll member with respect to the stationary scroll member whereby the involute wraps make moving line contacts to seal off and define moving pocket; housing means enclosing stationary and orbiting scroll members and defining a peripheral fluid zone therearound; and a thrust bearing/coupling component capable of simultaneously coupling the orbiting and stationary scroll members in predetermined angualr relationship, carrying axial loads imposed on the scroll members and comprising load carrying rolling members, a ring member having a plurality of uniformly spaced bearing pads having first and second oppositely disposed surfaces in each of which is cut an indentation to provide a plurality of first and second oppositely disposed indentations, and a plurality of third indentations cut in one surface of the orbiting scroll member corresponding in location to said first indentations and defining therewith a first plurality of tracks for the load carrying rolling members retained therein; a plurality of fourth indentations cut in a surface maintained stationary with respect to the orbiting scroll member correspnding in location to the second indentations and defining therewith a second plurality of tracks for the load carrying rolling members retained therein; the first and second tracks being of a size and configuration which permit the load carrying rolling members to undergo oscillatory motion over a distance equal to the orbit radius associated with the orbiting scroll member and the longer axes of the first tracks being perpendicular to those of the second tracks.

The thrust bearing/coupling components may be used as opposing, counteracting pairs to achieve more precise control over the compressive and/or axial loads imposed on the scroll members.

The principles of the operation of scroll apparatus have been presented in previously issued patents. (See for example U.S. Pat. No. 3,884,599.) It is therefore unnecessary to repeat a detailed description of the operation of such apparatus. It is only necesary to point out that a scroll-type apparatus operates by moving a sealed pocket of fluid taken from one region into another region which may be at a different pressure. If the fluid is compressed while being moved from a lower to higher pressure region, the apparatus serves as a compressor; if the fluid is expanded while being moved from a higher to a lower pressure region it serves as an expander; and if the fluid volume remains essentially constant independent of pressure, the apparatus serves as a liquid or vacuum pump.

The sealed pocket of fluid within the scroll apparatusis bounded by two parallel planes defined by end plates, and by two cylindrical surfaces defined by the involute of a circle or other suitably curved configuration. The scroll members have parallel axes since in only this way can the continuous sealing contact between the plane surface of the scroll members be maintained. A sealed pocket moves between these parallel planes as the two lines of contact between the cylindrical surfaces move. The lines of contact move because one cylindrical element, e.g., a scroll member, orbits within the other. This is accomplished, for example, by maintaining one scroll member stationary and orbiting the other scroll member.

FIG. 1 illusrates, in longitudinal cross section, a scroll apparatus constructed in accordance with this invention and designed to serve as a compressor, expander or vacuum pump. This apparatus will be seen to be comprised of a stationary scroll member 10 having an end plate 11 with a facing contacting surface 12 and a stationary involute wrap 13 having an involute contacting sealing surface 14; and an orbiting scroll member 15 having an end plate 16 with a facing contacting surface 17 and an orbiting involute wrap 18 having an involute contacting/sealing surface 19. The orbiting scroll member 15 is driven by a suitable driving means, e.g., an automotive power plant, through shaft 25 mounted to orbiting scroll member 15 through bearing 26 seated in bearing housing 27 which is conveniently an integral part of orbiting end plate 16. The axis 28 of shaft 25 is parallel but spaced from the machine axis 29 by a distance equal to the orbit radius of the scroll apparatus (FIG. 2). The main drive shaft of the power plant may be connected to shaft 25 through a complant mechanical linking means as taught by U.S. Pat. No. 3,924,977.

The scroll members 10 and 15 are located within a housing 30 at one end of which the stationary scroll member is affixed or made integral with it. In the embodiment illustrated in FIG. 1, the housing 30 comprises a central cylindrical member 31, a shorter inwardly flanged section 32, providing a seat for stationary end plate 11, and a longer inwardly flanged section 33 which defines an annular fluid passage 34 with bearing housing 27.

A fluid passage 40, adapted for connection through suitable means to a fluid conduit line (not shown) provides fluid communication with the central fluid pocket 41; and annular fluid passage 34 provides fluid communication between the peripheral fluid chamber 42 and the atmosphere (or other fluid reservoir). Between peripheral chamber 42, the zone of lowest pressure, and central fluid pocket 41, the zone of highest pressure, are a series of fluid pockets 43, 44, 45 and 46, the pressure of which increases inwardly. In compressors and expanders each involute wrap 13 and 18 is generally formed of two or more turns; while in vacuum pumps and liquid pumps the involute wraps must comprise at least one and one-half turns but no more than one and five-eighths turns. When the apparatus serves as a compressor, fluid is taken in through annular passage 34 and compressed fluid is discharged through passage 40; when it serves as a vacuum pump or liquid pump, the fluid may be directed either radially inward or outward; and when it serves as an expander compressed fluid will be introduced through passage 40 and expanded fluid will be discharged through annular passage 34.

The orbiting of scroll member 15 with respect to the stationary scroll member 10 requires that the two scroll members be coupled to maintain a fixed, predetermined angular relationship between them. This is, of course, whether shaft 25 is driven by a motor or whether it is used to transmit energy to a work absorbing means. Coupling is customarily done through the use of a separate coupling member (see for example U.S. Pat. Nos. 3,924,977 and 4,121,438) which presents separate problems of wear, alignment and assembly.

Because of the nature of the scroll apparatus, i.e., radial and axial pressure gradients, it is necessary to provide some means to urge sealing contact between stationary end plate surface 12 and orbiting involute surface 19 on one hand and orbiting end plate surface 17 and stationary involute surface 14 on the other hand. As will be described below in conjunction with FIGS. 8 and 9, such sealing contact may be through axial compliance sealing means. However, in any event, it is necessary to provide some form of axial loading and with it some form of axial compressive load carrying means capable of controlling the wearing of the contacting surfaces. Wear control is particularly important in automotive auxiliary equipment wherein efficient performance is required over very long periods of time without maintenance. As will be apparent from the following descriptions of the various embodiments of scroll apparatus to which the thrust bearing/coupling component is applicable, the major axial load on the scrolls may be generated by the means used to effect radial sealing or by the fluid itself as it flows through the apparatus.

In accordance with this invention, a single component is used which combines the functions of the expansive or compressive thrust carrying means and the coupling means, this component being referred to as the thrust bearing/coupling component. In the compressor or expander embodiment of FIGS. 1-3 the thrust bearing/coupling component, generally indicated by the reference numeral 50, is designed to carry the expansive thrust developed by the high-pressure fluid within the scroll pockets. This thrust bearing/coupling component of FIGS. 1-3 comprises a plurality of spheres 51, each of which is confined to a continuous rotary motion within facing circular indentations 52 and 53 in orbiting scroll end plate surface 54 and in the internal surface 55 of the longer flange section of the stationary housing, respectively. The spheres 51 are preferably ball bearings and they may be maintained in radially and circumferential alignment by a sphere retainer ring 56 having holes 57 drilled therethrough. FIG. 2 illustrates in somewhat diagrammatic fashion for three of the ball bearings the relative position of indentations 52 and 53 for the scroll element for one point in the orbit cycle. It will be seen from this figure that the centers of indentations 52 and 53 of the stationary and orbiting scroll members are located on circles having the same radius.

The size of the indentations 52 and 53 relative to the diameter, $D_s$, of a sphere and the orbit radius, $R_o$, of the orbiting scroll member is shown diagrammatically in FIG. 3. In its movement during an orbiting cycle a sphere 51 must be able to travel a distance equal to one-half of the orbit radius, i.e., $R_o/2$, in all directions from its central position as shown in FIGS. 3A and B. Thus it will be apparent that if the depth of an indentation 52 (or 53) were made equal to the sphere radius, $R_s$, the diameter, $D_i$, of the indentation must be $D_s+R_o$. Since, however, the depth of indentation 52 is less than $R_s$, it follows that $D_i$ should be slightly less than $D_s+R_o$.

FIG. 3C is an enlarged cross section of the indentations and retainer ring showing the manner in which the orbiting scroll member end plate 16 (and its attached involute wrap 18) is free to orbit within the stationary scroll member while being maintained in the desired angular relationship with respect to the stationary scroll member. The diameters of spheres 51 and the depths of indentations 52 and 53 are preferably so sized that a small (e.g., 0.001 inch) running clearance is maintained during operation between surfaces 12 and 19 and between surfaces 14 and 17 to minimize surface wear while at the same time optimizing radial sealing. It will thus be apparent that the spheres 51 in their continuous rotary motion serve to carry the expansive thrust or loads which tend to separate the scroll members as well as to couple them.

The cross sectional configuration of the circular indentations 52 and 53 illustrated in FIG. 3A is an ideal configuration which may be somewhat difficult to machine in the surfaces of the scroll and housing members. The indentations may be cut with chamfered walls as described in conjunction with FIGS. 4 and 5 or with straight walls as shown in FIGS. 6 and 7.

Figure 5:
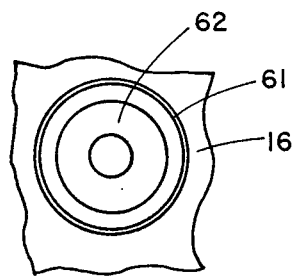
FIG. 5 is a top plan view of the circular indentation modification of FIG. 4.

In FIGS. 4 and 5 indentations 58 and 59 are shown to have straight sides 60 with chamfered lips 61 and contoured bottom channels 62, the configurations of the lips 61 and channels 62 in combination, corresponding to the spherical configuration of the spheres 51. The indentation embodiment of FIGS. 4 and 5 is relatively easy to machine, thus making it attractive for lowcost apparatus.

Figure 7:
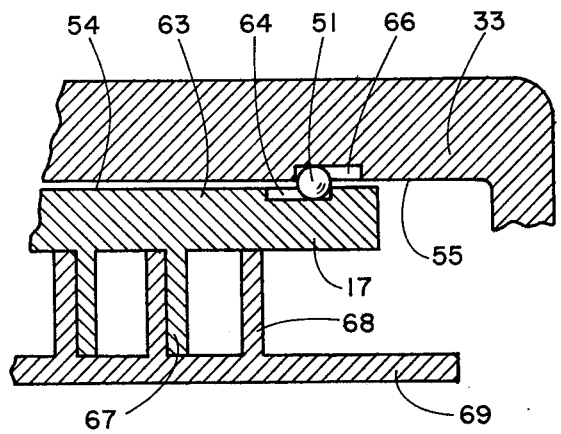
FIG. 7 is a partial cross section of scroll apparatus incorporating the orbiting scroll member of FIG. 6.
Figure 6:
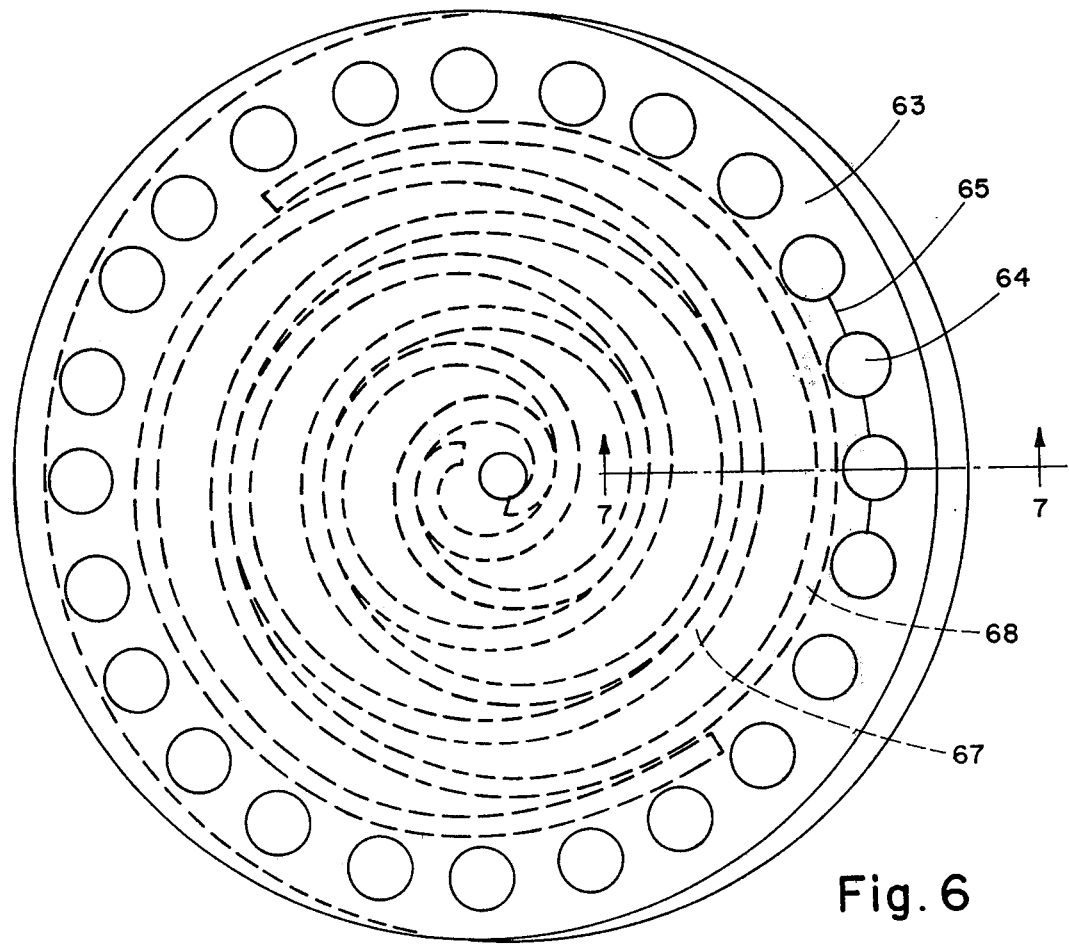
FIG. 6 is a top plan view of an orbiting scroll member constructed in accordance with this invention and suitable for use in a compressor or expander.

FIGS. 6 and 7 illustrate the use of straight-sided indentations, scroll members having involute wraps of multiple turns and the omission of a retainer ring for the load carrying spheres. The orbiting scroll end plate 63 of FIG. 6 has a plurality of indentations 64 cut therein which are equally spaced and have their centers on a circle 65. Housing section 33 likewise has a plurality of equally spaced indentations 66 cut in surface 55. A sphere 51 experiences continuous circular motion in the facing indentations 64 and 66 each of which are cut to a depth such that their combined depths is slightly less than the diameter of spheres 51 to prevent contact between surfaces 54 and 55 while ensuring that spheres 51 are always restrained within the confines of the facing indentations. Thus in this arrangement, a retainer ring such as 56 of FIG. 1 may be omitted.

Finally, FIGS. 6 and 7 show an orbiting scroll involute wrap 67 and stationary wrap 68 affixed to stationary end plate 69. Each wrap comprises a plurality of turns, e.g., more than the one and one-half required for a pump. Thus the scroll apparatus of FIGS. 6 and 7 is particularly suitable for constructing a compressor or an expander.

It will be apparent that the entire thrust bearing/coupling component of this invention requires only the machining of the circular indentations, and of the retaining ring 56 with equally spaced holes 57 if the ring is used. Commercially available ball bearings may be used as the thrust carrying spheres and the entire assembly is simple and straightforward, presenting essentially no problems of alignment, adjustment or assembly.

Figure 8:
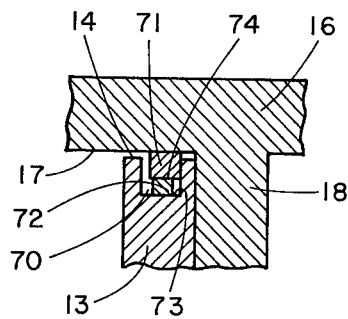
FIGS. 8 and 9 illustrate in cross section two different axial compliance sealing means which may be used in conjunction with the thrust bearing/coupling component of this invention.

It is possible to use axial compliance sealing means, such as those described in U.S. Pat. No. 3,994,636 and in copending application Ser. No. 947,460 filed in the name of John E. McCullough, with the thrust bearing/coupling component of this invention. Such axial compliance sealing means are illustrated in cross sections in FIGS. 8 and 9, wherein the same reference numerals are used to identify the same apparatus elements shown in FIG. 1. In the case of the embodiment of FIG. 8, both of the involute wraps, illustrated by stationary wrap 13, have channels 70 cut in their surfaces, e.g., surface 14, following the involute configuration of the wraps and extending throughout substantially their entire lengths. As illustrated in FIG. 8, an involutely configured seal element 71, which is somewhat smaller in cross section than channel 70, is located in channel 70 such that it is free to undergo a small lateral as well as axial movement within the channel. An elastomeric member 72 is interposed between the bottom surface 73 of the channel and surface 74 of seal element 71 to provide an axial force to urge element 71 to make sealing contact with end plate surface 17.

Figure 9:
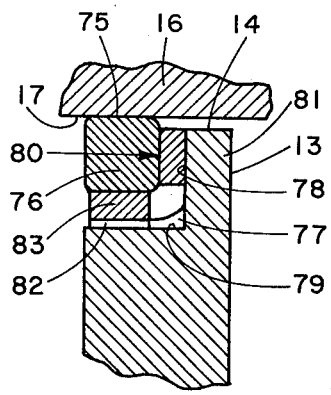

Another type of axial compliance sealing means is illustrated in FIG. 9 showing its application with respect to stationary wrap 13 and orbiting end plate 16. The same arrangement is also used for the orbiting wrap and stationary end plate. Like the sealing means of FIG. 8, that of FIG. 9 is continuous along essentially the entire length of the wrap and sealing contact is made between surface 75 of a seal element 76 and end plate surface 17. Seal element 76 is set in a two-sided channel 77 cut in the end surface 14 of wrap 13. The channel thus has a back surface 78 which is normal to surface 17 of end plate 16 and a seating surface 79 which is preferably parallel to surface 17. Channel 77 opens inwardly toward the centerline of the scroll element always facing the zone of higher pressure. In order to ensure continuous sealing throughout the length of the involute wrap while at the same time minimizing frictional wear, a seal spring, generally indicated by the numeral 80, is provided to compliantly apply an axial force on seal element 75, the seal-element being so designed and seal spring member being so sized that the seal element always extends slightly above wrap surface 13.

The seal spring 80 is preferably formed as a single continuous element, e.g., as a straight-backed member having a plurality of arcuate spring members centrally joined thereto through necks. By bending the arcuate spring members toward the back member 81 to form a 90° angle the arms of the arcuate members are bent upward along predetermined fold lines to leave a central flat spring seat 82 which rests on seating surface 79 of channel 77. The required axial force is applied by the spring arms 83 of seal element 80. The details of the construction of seal spring 80, along with modifications thereof, are given in copending application Ser. No. 947,460 incorporated herein by reference.

Figure 11:
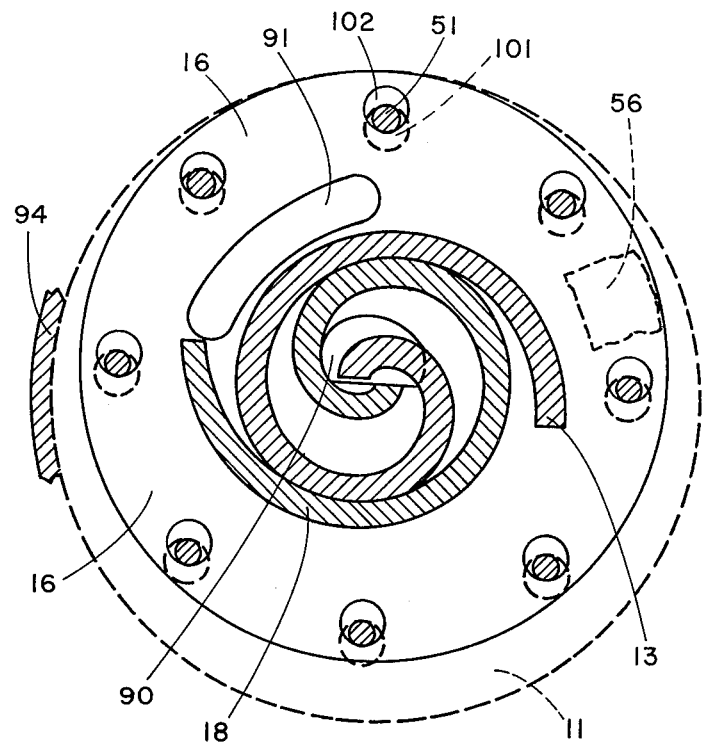
FIG. 11 is a cross section of the apparatus of FIG. 10, taken through plane 11—11 of FIG. 10, illustrating the respective positioning of the thrust bearing/coupling component used as well as the involute wraps and liquid pump porting.
Figure 10:
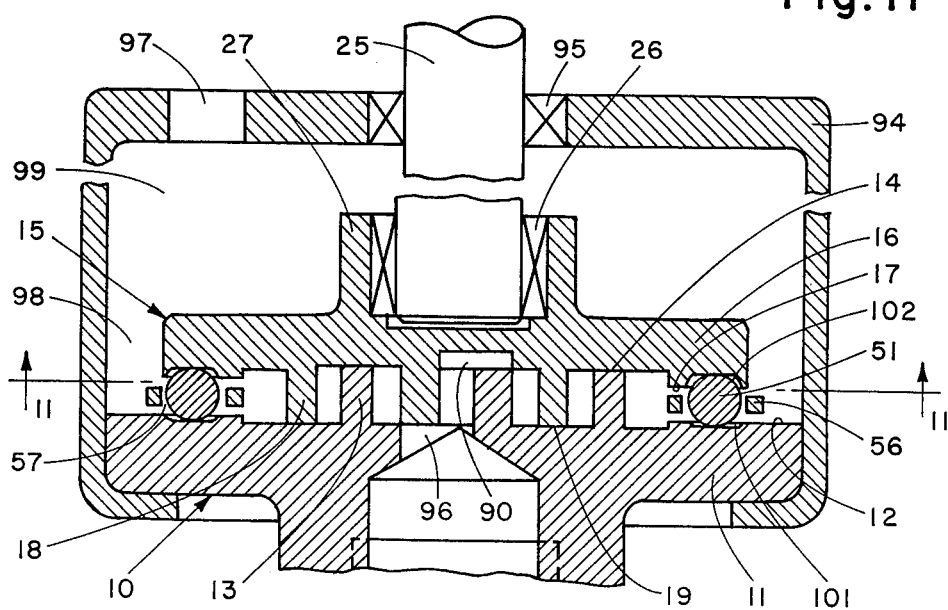
FIG. 10 is a longitudinal cross section through a scroll-type apparatus constructed in accordance with this invention and suitable as a vacuum pump or a liquid pump wherein a back pressure acts compressively on the scroll members.

FIGS. 10 and 11 illustrate the application of the thrust bearing/coupling component of this invention to a liquid pump wherein a fluid pressure of sufficient magnitude is built up within the pump housing to require a means to carry a compressive axial thrust within the scroll apparatus. The basic scroll design is similar to that illustrated in FIG. 1, except for a portion system uniquely designed to make it possible to pump a liquid without the generation of pulsations in the pump. This unique porting is described in U.S. Pat. No. 4,129,405 and one embodiment is illustrated in FIGS. 10 and 11 by the incorporation of a centrally located recessed transfer passage 90 and a peripheral recessed transfer passage 91 cut in both the stationary and orbiting scroll end plates as shown for the orbiting end plate 16 in FIG. 11.

The scroll pump of FIGS. 10 and 11 is located within a fluid-tight housing 94 through which shaft 25 extends and is maintained in alignment by a suitable shaft bearing 95. Liquid to be pumped is brought in through a central port 96 cut through stationary end plate 11 and is discharged through port 97 which has suitable pressure valve means (not shown) associated therewith. The liquid flows out of the scroll pump into the peripheral volume 98 and then into the main chamber 99. By controlling the liquid flow through discharge port 97 it is possible to build up and maintain a predetermined back pressure on the scroll members. When this back pressure reaches a level which causes undue compressive axial loading on the scroll members, it is necessary to use thrust bearing means capable of carrying such compressive loading to prevent undue wear of the contacting surfaces 12 and 19 and 14 and 17. The thrust bearing/coupling component 100 of this invention provides such means.

In the case of the liquid pump of FIGS. 10 and 11, circular indentations 101 and 102 of any suitable configuration, are cut in the facing surfaces 12 and 17 of the stationary and orbiting scroll members, respectively. A plurality of ball bearings 51 within openings 57 of a retaining ring, as in FIGS. 1–3, provide the thrust bearing capabilities and coupling function necessary to the operation of the scroll pump. It is also, of course, within the scope of this invention to use the indentation configurations of FIGS. 4 and 7 and to omit the retainer ring 56.

Figure 12:
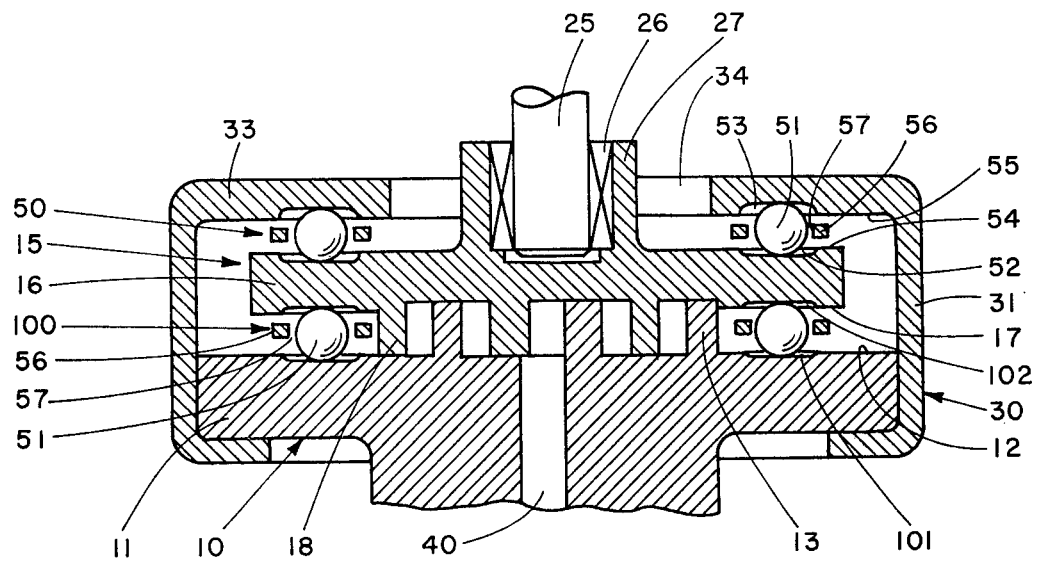
FIG. 12 is a longitudinal cross section through a scroll-type compressor, expander or pump which is another embodiment of the apparatus illustrated in FIG. 1 and which has counteracting, complementary thrust bearing/coupling components.

The scroll apparatus embodiment illustrated in FIG. 12 is essentially a combination of the embodiments of FIGS. 1 and 10 so far as the thrust bearing/coupling means are concerned. As in the previously defined embodiments, the facing indentations 52 and 53 forming part of component 50 and indentations 101 and 102 forming part of component 100 are cut in the orbiting scroll member and in a surface maintained stationary with respect to the stationary scroll member, these stationary surfaces bring a combination of the housing and the stationary scroll member. In the embodiment of FIG. 12 the two thrust bearing/coupling components 50 and 100 are in effect counteracting inasmuch as they carry the axial forces on the scroll members as well as moments from the scrolls. Thus it is possible to effect a more precise controlling of the axial loads imposed on the scroll members.

Figure 13:
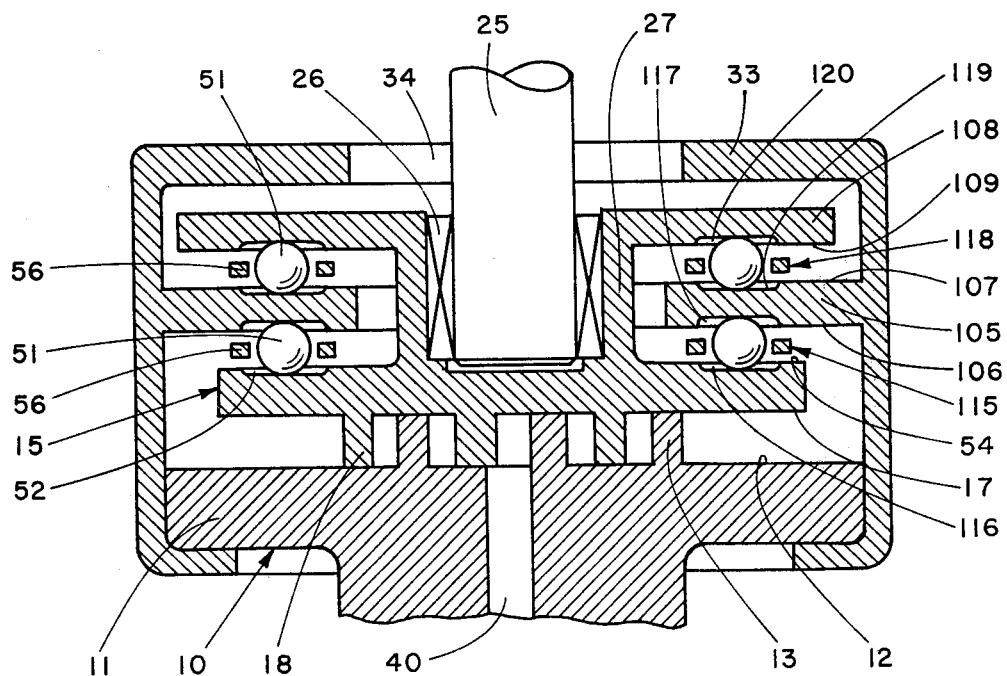
FIG. 13 is a longitudinal cross section through a scroll-type compresor, expander or pump, which is a modification of the apparatus of FIG. 12.

The same results are attained in the scroll apparatus of FIG. 13 wherein modifications are made in the main housing and scroll bearing housing to provide suitable support means for the thrust bearing/coupling component. Thus the central section 31 of the main housing has an internal flange 105 with a surface 106 facing surface 54 of orbiting end plate 16 and an opposite surface 107. Bearing housing 27 terminates in an outwardly directed flange 108 having a surface 109 facing surface 107 of housing flange 105. In forming the thrust bearing/coupling component 115 the circular indentations 116 and 117 are cut in orbiting scroll end plate surface 54 and surface 106 of housing flange 105, respectively, and in forming thrust bearing/coupling component 118 the circular indentations 119 and 120 are cut in surface 107 of flange 105 and surface 109 of flange 108, respectively. This means that both of the stationary surfaces in which the indentations are cut for the thrust bearing-/coupling are provided by the housing means.

Either one or both of the thrust bearing/coupling components 50 and 100 of FIG. 12 or 115 and 118 of FIG. 13 may be constructed without a retainer ring as illustrated in FIG. 7 and with circular indentations of any suitable cross sectional configuration.

In the thrust bearing/coupling component embodiments of FIGS. 14–23, the load carrying members, which may be spheres or rollers, undergo oscillatory motion within tracks defined on either side of a plurality of bearing pads and on the orbiting scroll members on one side nd on a stationary surface on the other. Thus, in these embodiments the axial load is carried by oscillating members through the bearing pads.

Figure 14:
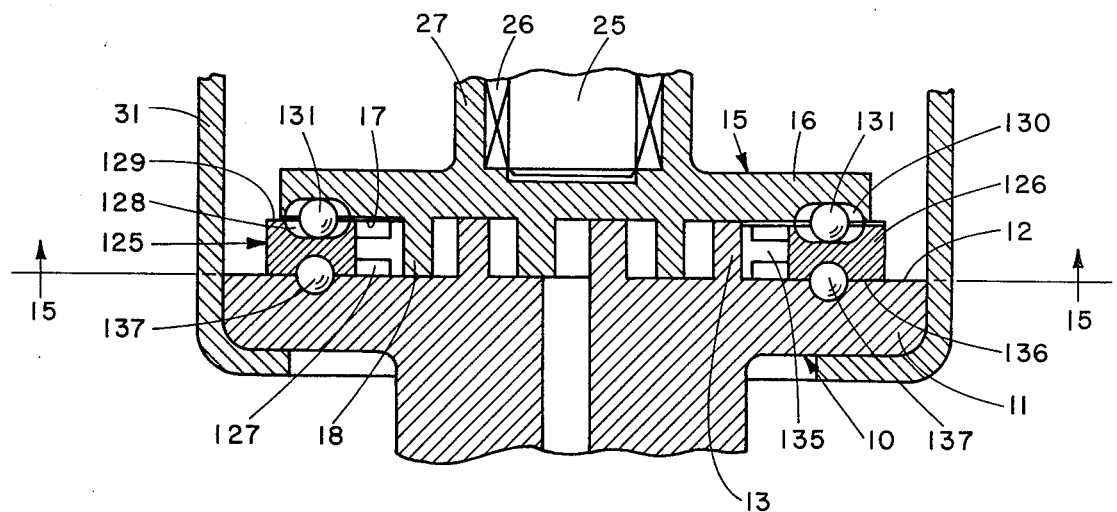
FIG. 14 illustrates an embodiment of the thrust bearing/coupling component of this invention in which rolling members, undergoing oscillatory motion within tracks defined between bearing pads and scroll members and/or housing, carry axial loads through the bearing pads.
Figure 15:
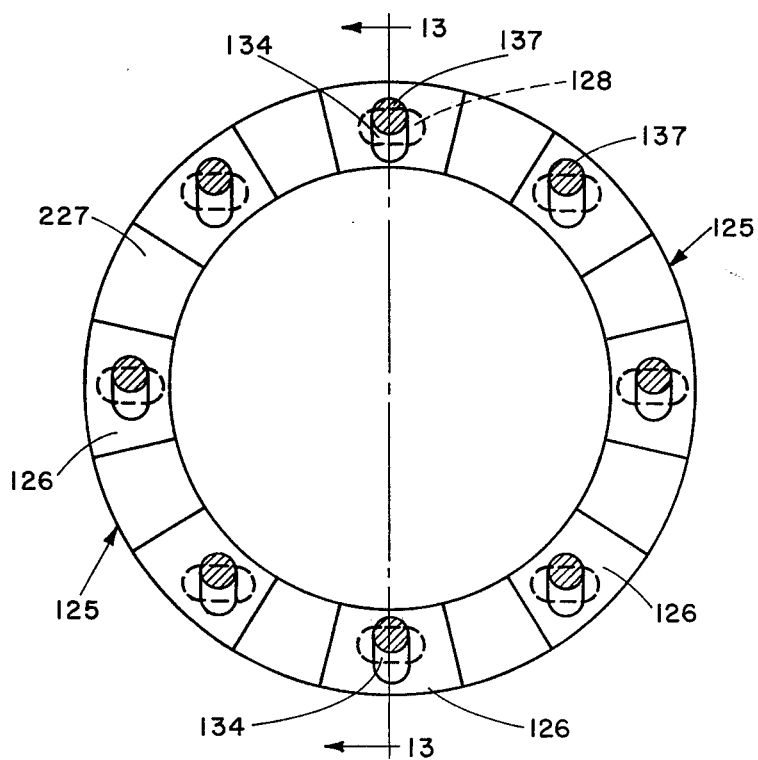
FIGS. 15 and 16 are plane and cross sectional views, respectively, of the thrust bearing/coupling component of FIG. 14.
Figure 16:
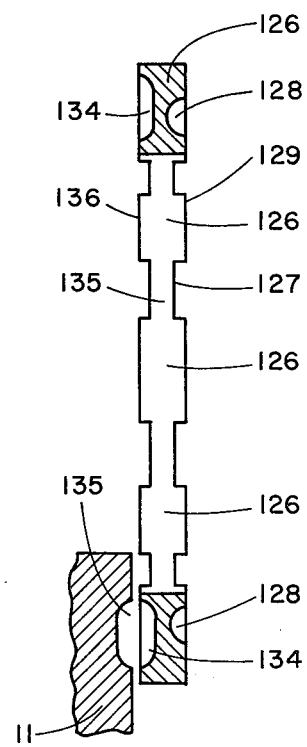
Figure 17:
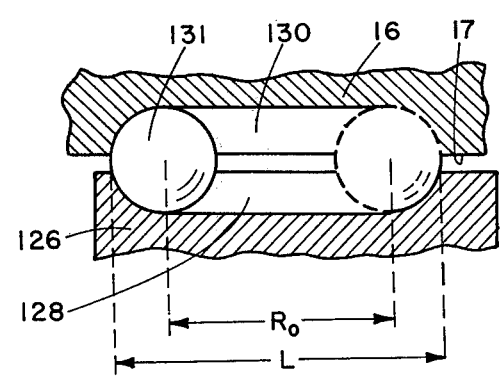
FIG. 17 is an enlarged cross section of a load carrying member track used in the embodiment of FIGS. 14–16 and illustrating the relative length of the track and size of the load carrying member.

In the embodiment of FIGS. 14–16 the thrust bearing/coupling component comprises an annular ring 125 configured to have a plurality of uniformly spaced bearing pads 126 and defining between them fluid passages 127. An indentation 128 is cut into the surface 129 of each bearing pad 126 which faces surface 17 of orbitine end plate 16. Indentations 130 are cut in orbiting end plate surface 17 to correspond in configuration and axis orientation to channels 128 in the bearing pads such that any facing pair of indentations form a track in which a load carrying sphere 131 experiences oscillatory motion as scroll member 15 is orbited with respect to stationary scroll member 10. The combined depth of facing indentations, e.g., 128 and 130, is slightly less than the diameter of spheres 131 which means that the rim-to-rim length L (FIG. 17) is equal to or less than $D+R_o$ where D is the diameter of spheres 131 and $R_o$ is the orbit radius. Thus the distance traveled by a sphere within its track is equal to $R_o$ as shown in FIG. 17.

In a similar manner, indentation 134 and 135 (FIGS. 15 and 16) are cut into surface 136 of bearing pads 126 and in the facing surface 12 of end plate 11 of the stationary scroll member, and spheres 137 are positioned to experience oscillatory motion within the tracks defined by facing indentations. The longer axes of indentations 134 and 135 are perpendicular to the longer axes of indentations 128 and 130. Thus spheres 131 and 137 carry the axial compressive load on the scroll members through bearing pads 126. In their restrained movement along the axes of the tracks in which they are confined, these spheres maintain the required angular relationship between the orbiting and stationary scroll members.

Figure 18:
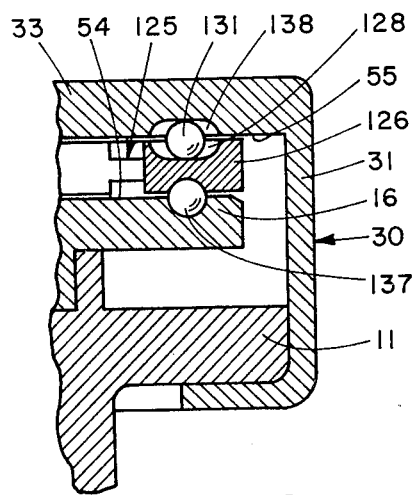
FIGS. 18, 19 and 20 are partial cross sectional views of the application of the thrust bearing/coupling embodiment of FIG. 14 to scroll apparatus comparable to that of FIGS. 1, 12 and 13, respectively.
Figure 20:
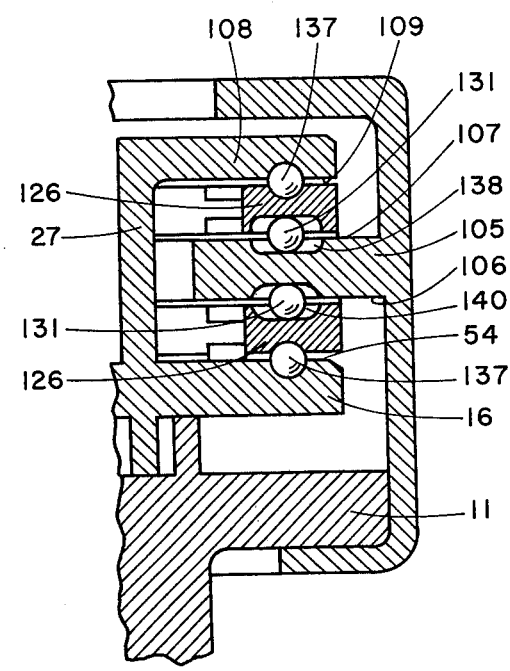
Figure 19:
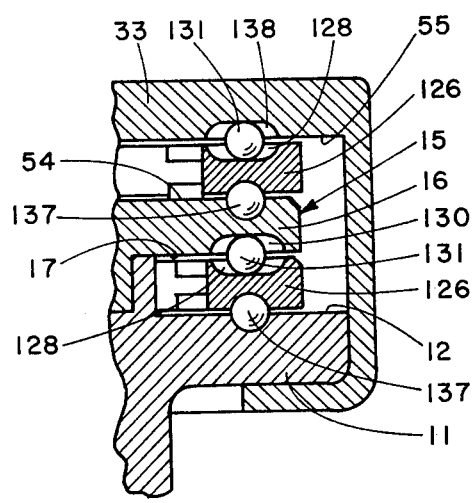

It is, of course, within the scope of this invention to use the combination of ball bearings and ring with bearing pads illustrated in FIGS. 14–16 in modifications comparable to those of FIGS. 1, 12 and 13, and this is illustrated in the partial cross sections of FIGS. 18–20 wherein the same reference numerals are used to identify the same apparatus components. The indentations 138 cut in housing surface 55 provide the necessary indentations in a stationary surface to face indentations 128 in the bearing pad surface, and indentations 139 are cut in surface 54 of the orbiting end plate to face indentations 134 of the bearing pad. As in the case of FIG. 1, the thrust bearing/coupling component of FIG. 18 is particularly suitable for a scroll compressor or expander, or a vacuum pump.

In the embodiment of FIG. 19, like that of FIG. 13, counteracting thrust bearing/coupling components are positioned on either side of orbiting scroll member 15, and the stationary surfaces in which indentations are cut are the surface 12 of stationary end plate 11 and surface 55 of housing section 33. In the embodiment of FIG. 20, like that of FIG. 14, counteracting thrust bearing/coupling components are positioned on either side 106 and 107 of inwardly directed housing flange 105 which provides both stationary surfaces for indentations 139 and 140. The opposing 90° oriented tracks for spheres 131 and 137 are defined in the surfaces of associated bearing pads 126 and end plate 16 and the surfaces of associated bearing pads 126 and flange 108 of scroll bearing housing 27.

Figure 21:
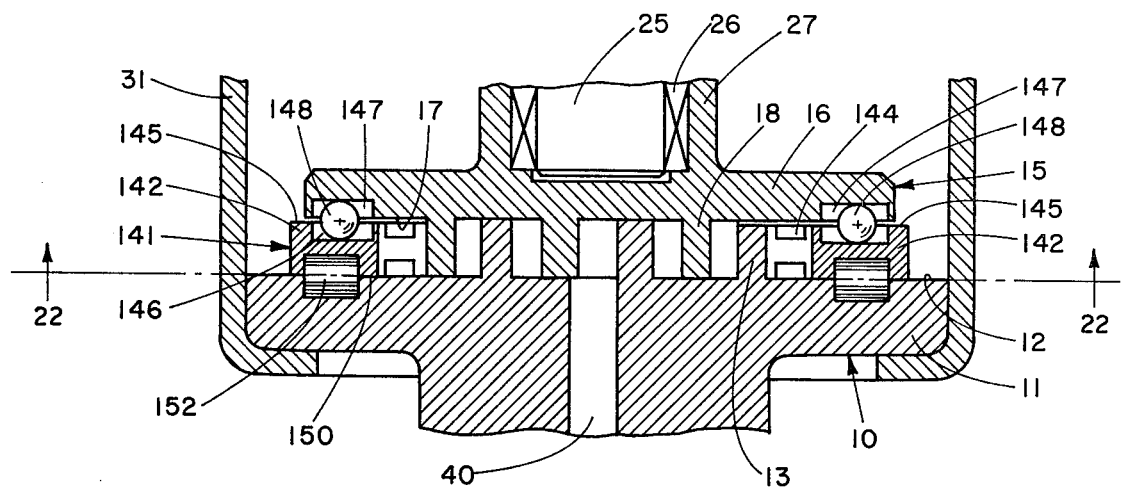
FIG. 21 illustrates a modification of the thrust bearing/coupling component of FIG. 14 in which rollers in place of spheres undergo oscillatory motion and serve in the dual role of load carrying and coupling.
Figure 22:
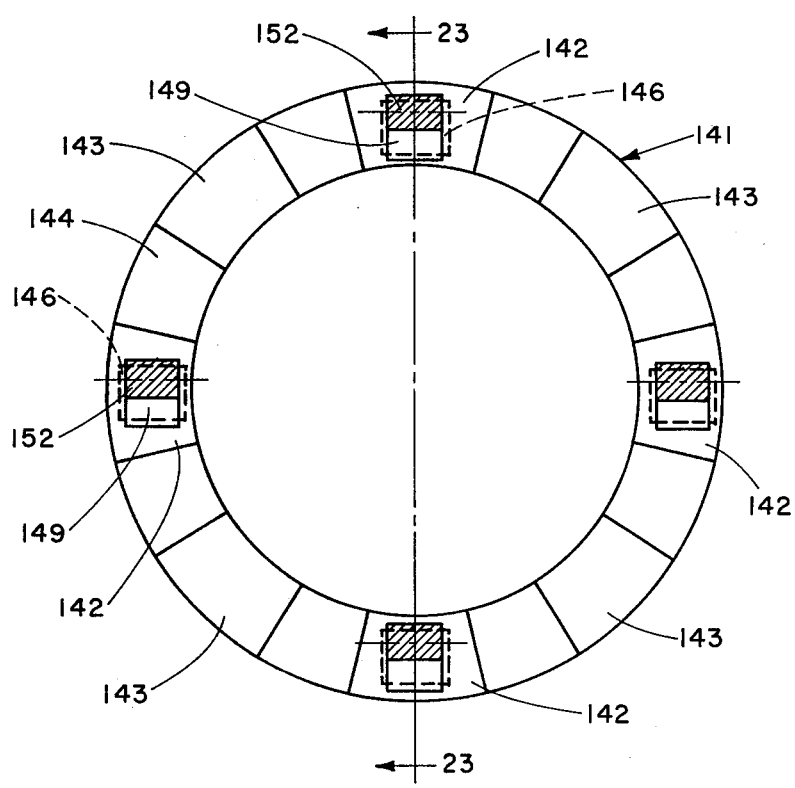
FIGS. 22 and 23 are plane and cross sectional views, respectively of the thrust bearing/coupling component of FIGS. 21.
Figure 23:
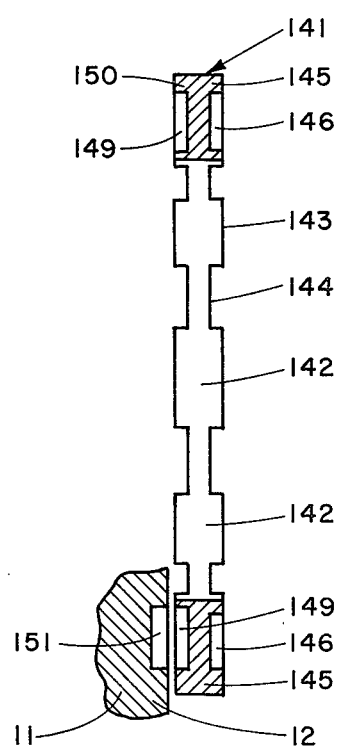

The thrust bearing/coupling component shown in FIGS. 21–23 represent a modification of the component of FIGS. 14–16, in that rollers replace the spheres as the load carrying rolling members. The annular ring 141 is of the same general configuration as in FIGS. 14–16, having bearing pads 142 and 143 equally spaced therearound and fluid passages 144. The surfaces of the four bearing pads 142 which are spaced at 90° from each other have indentations used to form rolling member tracks; while the remaining bearing pads 143 serve only in axial load-carrying capacity without any associated load-carrying rolling members. The surfaces 145 of bearing pads 142, which face surface 17 of orbiting end plate 16, have indentations 146 cut therein; and surface 17 likewise has four corresponding indentations 147 cut in it, the two indentations defining an essentially closed track in which a roller 148 can travel as shown by FIG. 21. The combined depth of indentations 146 and 147 is slightly less than the diameter of roller 148 and, like the spheres of the embodiments of FIGS. 14–20, the distance of roller travel is equivalent to the orbit radius ($R_o$). Bearing pads 142 also have indentations 149 cut in surface 150 which faces surface 12 of end plate 11 of the stationary scroll member. Likewise surface 12 has four indentations 151 (FIG. 23) corresponding to indentations 149; and as shown in FIGS. 21 and 23, the indentations 149 and 151 are oriented in respect to indentations 146 and 147 so that rollers 152 traveling in indentations 149 and 151 have their longer axes at 90° from the longer axes of rollers 148. As in the case of spheres 131 and 137 of FIGS. 14–20, the rollers and annular ring with its bearing pads of the modification shown in FIGS. 21-23 serve both axial load carrying and coupling functions. It is, of course, within the scope of this invention to also use rollers in place of spheres as load carrying members in the apparatus embodiments of FIGS. 18-20.

It will be seen from the above detailed description of the thrust bearing/coupling component and the scroll apparatus incorporating it, that there are provided scroll compressors, expanders and pumps (both liquid and vacuum pumps) which are relatively easy to fabricate, assemble and align to make a reliable, 1 ng-running efficient piece of equipment. The various components of these scroll devices, i.e., the scroll members and housing means may be formed of suitable plastic materials (e.g., polyimides and the like) or of metal, depending upon the function of the apparatus. For example, pump components may be formed of plastics, while compressors and expanders will normally be formed of a metal such as stainless steel. The machining operations required to cut the indentations are well developed and commercially available ball bearings are suitable for the load carrying members.

The compressors, expanders and pumps constructed in accordance with this invention possess a number of distinct advantages as auxiliary equipment for automotive systems. They are inexpensive to make, light in weight, and efficient; and because of their inherent method of operation they exert no detrimental widely varying torque requirements on the automotive engine by which they are driven.

It will thus be seen that the objects set forth above, among those made apparent from the preceding description, are efficiently attained and, since certain changes may be made in the above constructions without departing from the scope of the invention it is intended that all matter contained in the above description or shown in the accompany ng drawings shall be interpreted as illustrative and not in a limiting sense.

We claim:

1. A thrust bearing/coupling component capable of simultaneously coupling an orbiting scroll member having a predetermined orbit radius and a stationary scroll member in predetermined angular relationship as said orbiting scroll member is orbited with respect to said stationary scroll member and carrying axial loads imposed on said scroll members, comprising in combination
   (a) a plurality of first circular spaced indentations cut in one surface of said orbiting scroll member;
   (b) a plurality of second circular spaced indentations of the same cross sectional configuration as said first indentations cut in a surface maintained stationary with respect to said orbiting scroll member and facing said first indentations, the centers of all of said indentations being located on circles having the same radius;
   (c) an axial load carrying rolling sphere movable within each facing pair of said indentations, the relative diameters of said spheres and of said indentations being such as to permit said spheres to travel a distance equal to one-half of said orbit radius of said orbiting scroll member in all directions from their central positions thereby to maintain said predetermined angular relationship between said scroll members.

2. A thrust bearing/coupling components in accordance with claim 1 wherein said stationary surface is provided by housing means enclosing said scroll members whereby said component carries expansive axial loads tending to force apart said scroll members.

3. A thrust bearing/coupling component in accordance with claim 1 wherein said stationary surface is provided by said stationary scroll member whereby said component carries compressive loads tending to force together said scroll members.

4. A thrust bearing/coupling component in accordance with claim 1 wherein said cross sectional configuration of said circular indentations includes at least one chamfered section.

5. A thrust bearing/coupling component in accordance with claim 1 wherein said cross sectional configuration of said circular indentations is rectangular.

6. A thrust bearing/coupling component in accordance with claim 1 including sphere retaining ring means interposed between said facing surfaces and having cut therethrough spaced holes of a diameter slightly greater than the diameter of said spheres.

7. A thrust bearing/coupling component in accordance with claim 1 including sphere retaining ring means interposed between said facing surfaces and having cut therethrough spaced holes of a diameter slightly greater than the diameter of said spheres.

8. A thrust bearing/coupling component in accordance with claim 1 including
   (e) a third plurality of circular indentations cut in another surface of said orbiting scroll member;
   (f) a fourth plurality of circular indentations cut in another surface maintained stationary with respect to said orbiting scroll member and facing said third indentations, said third and fourth indentations having the same cross sectional configuration and having centers located on circles of the same radius; and
   (g) an axial load carrying rolling sphere movable within each facing pair of said third and fourth indentations, the relative diameters of said spheres and of said third and fourth indentations being such as to maintain said predetermined angular relationship between said scroll members.

9. A thrust bearing/coupling component in accordance with claim 8 wherein said stationary surfaces are provided by said stationary scroll member and by housing means enclosing said scroll members.

10. A thrust bearing/coupling component in accordance with claim 8 wherein both of said stationary surfaces are provided by housing means enclosing said scroll members.

11. A thrust bearing/coupling component in accordance with claim 8 wherein said third and fourth circular indentations are sized to permit said spheres to travel a distance equal to one-half of said orbit radius of said orbiting scroll member in all directions from their central positions.

12. A thrust bearing/coupling component in accordance with claim 8 wherein said cross sectional configuration of said third and fourth circular indentations includes at least one chamfered section.

13. A thrust bearing/coupling component in accordance with claim 8 wherein said cross sectional configuration of said third and fourth circular indentations is rectangular.

14. A thrust bearing/coupling component in accordance with claim 8 wherein said spheres within said facing pairs of said third and fourth indentations are of a diameter different from said spheres within said facing pairs of said first and second indentations.

15. A thrust bearing/coupling component capable of simultaneously coupling an orbiting scroll member and a stationary scroll member in predetermined angular relationship as said orbiting scroll member is orbited with respect to said stationary scroll member and carrying axial loads imposed on said scroll members, comprising in combination
 (a) load carrying rolling members;
 (b) a ring member having a plurality of uniformly spaced bearing pads having first and second oppositely disposed surfaces in each of which is cut an indentation to provide a plurality of first and second oppositely disposed indentations;
 (c) a plurality of third indentations cut in one surface or said orbiting scroll member corresponding in location to said first indentations and defining therewith a first plurality of tracks for said load carrying rolling members retained therein;
 (d) a plurality of fourth indentations cut in a surface maintained stationary with respect to said orbiting scroll member corresponding in location to said second indentations and defining therewith a second plurality of tracks for said load carrying rolling members retained therein; said first and second tracks being of a size and configuration which permit said load carrying rolling members to undergo oscillatory motion over a distance equal to the orbit radius associated with said orbiting scroll member, and the longer axes of said first tracks being perpendicular to those of said second tracks.

16. A thrust bearing/coupling component in accordance with claim 15 wherein said load carrying rolling members are spheres.

17. A thrust bearing/coupling component in accordance with claim 15 where in said load carrying rolling members are rollers.

18. A thrust bearing/coupling component in accordance with claim 15 wherein said stationary surface is provided by housing means enclosing said scroll members whereby said component carries expansive loads tending to force apart said scroll members.

19. A thrust bearing/coupling component in accordance with claim 15 where said stationary surface is provide by said stationary scroll member whereby said component carries compressive loads tending to force together said scroll members.

20. A thrust bearing/coupling component in accordance with claim 16 including
 (e) a second ring member having a plurality of uniformly spaced bearing pads having first and second oppositely disposed surfaces in each of which is cut an indentation to provide a plurality of third and fourth oppositely disposed indentations;
 (f) a plurality of fifth indentations cut in another surface of said orbiting scroll member corresponding in location to said third indentations and defining therewith a third plurality of tracks for load carrying rolling members retained therein;
 (g) a plurality of sixth indentations cut in a surface maintained stationary with respect to said orbiting scroll member corresponding in location to said fourth indentations and defining therewith a fourth plurality of tracks for said load carrying rolling members retained therein; said third and fourth tracks being of a size and configuration which permit said load carrying rolling members to undergo oscillatory motion over a distance equal to the orbit radius associated with said orbiting scroll member and the longer axes of said third tracks being perpendicular to those of said fourth tracks.

21. A thrust bearing/coupling component in accordance with claim 20 wherein said stationary surfaces are provided by said stationary scroll member and by housing means enclosing said scroll members.

22. A thrust bearing/coupling component in accordance with claim 20 wherein both of said stationary surfaces are provided by housing means enclosing said scroll members.

23. A positive fluid displacement apparatus suitable as a fluid compressor, expander or pump, comprising in combination
 (a) a stationary scroll member comprising a stationary end plate and a stationary involute wrap;
 (b) an orbiting scroll member, comprising an orbiting end plate and an orbiting involute wrap;
 (c) means to orbit said orbiting scroll member with a predetermined orbit radius respect ot said stationary scroll member whereby said involute wraps make moving line contacts to seal off and define moving pockets of variable volume including a central pocket;
 (d) housing means enclosing said stationary and orbiting scroll members and defining a peripheral fluid zone therearound and
 (e) a thrust bearing/coupling component capable of simultaneously coupling said orbiting and stationary scroll members in predetermined angular relationship and carrying axial loads imposed on said scroll members, comprising in combination
  (1) a plurality of first circular spaced indentations cut in one surface of said orbiting scroll member,
  (2) a plurality of second circular spaced indentations of the same cross sectional configuration as said first indentations cut in a surface maintained stationary with respect to said orbiting scroll member and facing said first indentations, the centers of all of said indentations being located on circles having the same radius, and
  (3) an axial load carrying rolling sphere movable within each facing pair of said indentations, the relative diameters of said spheres and of said indentations being such as to permit said spheres to travel a distance equal to one-half of said orbit radius of said orbiting scroll member in all directions from their central positions thereby to maintain said predetermined angular relationship between said scroll members.

24. A positive fluid displacement apparatus in accordance with claim 23 wherein said stationary surface is provided by said housing means whereby said component carries expansive axial loads tending to force apart said scroll members.

25. A positive fluid displacement apparatus in accordance with claim 23 wherein said stationary surface is provided by said stationary scroll member whereby said component carries compressive loads tending to force together said scroll members.

26. A positive fluid displacement apparatus in accordance with claim 23 wherein said cross sectional configuration of said circular indentations includes at least one chamfered section.

27. A positive fluid displacement apparatus in accordance with claim 23 wherein said cross sectional configuration of said circular indentations is rectangular.

28. A positive fluid displacement apparatus in accordance with claim 23 including sphere retaining ring means interposed between said facing surfaces and having cut therethrough spaced holes of a diameter slightly greater than the diameter of said spheres.

29. A positive fluid displacement apparatus in accordance with claim 23 wherein said stationary and orbiting involute wraps each comprises essentially one and one-half turns and said apparatus is a pump.

30. A positive fluid displacement apparatus in accordance with claim 23 wherein said stationary and orbiting involute wraps each comprises multiple turns and said apparatus is a compressor or expander.

31. A positive fluid displacement apparatus in accordance with claim 23 including sphere retaining ring means interposed between said facing surfaces and having cut therethrough spaced holes of a diameter slightly greater than the diameter of said spheres.

32. A positive fluid displacement apparatus in accordance with claim 23 wherein said thrust bearing/coupling component also comprises
   (4) a third plurality of circular indentations cut in another surface of said orbiting scroll member;
   (5) a fourth plurality of circular indentations cut in another surface maintained stationary with respect to said orbiting scroll member and facing said third indentations, said third and fourth indentations having the same cross sectional configuration and having centers located on circles of the same radius; and
   (6) an axial load carrying rolling sphere movable within each facing pair of said third and fourth indentations, the relative diameters of said spheres and of said third and fourth indentations being such as to maintain said predetermined angular relationship between said scroll members.

33. A positive fluid displacement apparatus in accordance with claim 32 wherein said stationary surfaces are provided by said stationary scroll member and by said housing means.

34. A positive fluid displacement apparatus in accordance with claim 32 wherein both of said stationary surfaces are provided by said housing means.

35. A positive fluid displacement apparatus in accordance with claim 32 wherein said third and fourth circular indentations are sized to permit said spheres to travel a distance equal to one-half of said orbit radius of said orbiting scroll member in all directions from their central positions.

36. A positive fluid displacement apparatus suitable as a fluid compressor, expander or pump, comprising in combination
   (a) a stationary scroll member comprising a stationary end plate and a stationary involute wrap;
   (b) an orbiting scroll member, comprising an orbiting end plate and an orbiting involute wrap;
   (c) means to orbit said orbiting scroll member with respect to said stationary scroll member whereby said involute wraps make moving line contacts to seal off and define moving pockets of variable volume including a central pocket;
   (d) housing means enclosing said stationary and orbiting scroll members and defining a peripheral fluid zone therearound; and
   (e) a thrust bearing/coupling component capable of simultaneously coupling said orbiting and stationary scroll members in predetermined angular relationship and carrying axial loads imposed on said scroll members, comprising in combination
     (1) load carrying rolling members,
     (2) a ring member having a plurality of uniformly spaced bearing pads having first and second oppositely disposed surfaces in each of which is cut an indentation to provide a plurality of first and second oppositely disposed indentations, and
     (3) a plurality of third indentations cut in one surface of said orbiting scroll member corresponding in location to said first indentations and defining therewith a first plurality of tracks for said load carrying rolling members retained therein; and
     (4) a plurality of fourth indentations cut in a surface maintained stationary with respect to said orbiting scroll member corresponding in location to said second indentations and defining therewith a second plurality of tracks for said load carrying rolling members retained therein, said first and second tracks being of a size and configuration which permit said load carrying rolling members to undergo oscillatory motion over a distance equal to the orbit radius associated with said orbiting scroll member and the longer axes of said first tracks being perpendicular to those of said second tracks.

37. A positive fluid displacement apparatus in accordance with claim 36 wherein said load carrying rolling members are spheres.

38. A positive fluid displacement apparatus in accordance with claim 36 wherein said load carrying rolling members are rollers.

39. A positive fluid displacement apparatus in accordance with claim 36 wherein said stationary surface is provided by said housing means whereby said component carries expansive loads tending to force apart said scroll members.

40. A positive fluid displacement apparatus in accordance with claim 36 wherein said stationary surface is provided by said stationary scroll member whereby said component carries compressive loads tending to force together said scroll members.

41. A positive fluid displacement apparatus in accordance with claim 36 wherein said stationary and orbiting involute wraps each comprise essentially one and one-half turns and said apparatus is a pump.

42. A positive fluid displacement apparatus in accordance with claim 36 wherein said stationary and orbiting involute wraps each comprise multiple turns and said apparatus is a compressor or expander.

43. A positive fluid displacement apparatus in accordance with claim 36 wherein said thrust bearing/coupling component also comprises
   (5) a second ring member having a plurality of uniformly spaced bearing pads having first and second oppositely disposed surfaces in each of which is cut an indentation to provide a plurality of third and fourth oppositely disposed indentations,
   (6) a plurality of fifth indentations cut in another surface of said orbiting scroll member corresponding in location to said third indentations and defining therewith a third plurality of tracks for said load carrying rolling members retained therein, and
   (7) a plurality of sixth indentations cut in a surface maintained stationary with respect to said orbiting scroll member corresponding in location to said fourth indentations and defining therewith a fourth plurality of tracks for said load carrying rolling members retained therein; said third and fourth tracks being of a size and configuration which permit said load carrying rolling members to undergo oscillatory motion over a distance equal to the orbit radius associated with said orbiting scroll member and the longer axes of said third tracks being perpendicular to those of said fourth tracks.

44. A positive fluid displacement apparatus in accordance with claim 43 wherein said stationary surfaces are provided by said stationary scroll member and by said housing means.

45. A positive fluid displacement apparatus in accordance with claim 43 wherein both of said stationary surfaces are provided by said housing member.

* * * * *